United States Patent [19]

Ben-Arieh et al.

[11] Patent Number: 4,807,108

[45] Date of Patent: Feb. 21, 1989

[54] PRODUCT REALIZATION METHOD

[75] Inventors: David Ben-Arieh, Columbus; Charles A. Fritsch, New Albany; Kostia Mandel, Columbus, all of Ohio; Albert F. Starzinski, Long Branch, N.J.; Raghunath Venugopal, Columbus, Ohio

[73] Assignee: American Telephone and Telegraph Company, AT&T Bell Laboratories, Murray Hill, N.J.

[21] Appl. No.: 83,329

[22] Filed: Aug. 10, 1987

[51] Int. Cl.$^4$ .................. G05B 13/02; G06F 15/46
[52] U.S. Cl. .................... 364/148; 364/468
[58] Field of Search ............ 364/148, 156, 152, 402, 364/150, 552, 401, 200, 900

[56] References Cited

U.S. PATENT DOCUMENTS

| | | | |
|---|---|---|---|
| 4,233,660 | 11/1980 | Fagan | 364/104 |
| 4,320,463 | 3/1982 | Himmelstein | 364/552 |
| 4,368,509 | 1/1983 | Li | 364/148 |
| 4,369,563 | 5/1986 | Williamson | 29/568 |
| 4,610,886 | 9/1986 | Buller-Colthurst | 426/233 |
| 4,648,023 | 3/1987 | Powell | 364/156 |
| 4,710,864 | 12/1987 | Li | 364/152 |
| 4,744,026 | 5/1988 | Vanderbei | 364/402 |
| 4,744,028 | 5/1988 | Karmarkar | 364/402 |

Primary Examiner—Jerry Smith
Assistant Examiner—Paul Gordon
Attorney, Agent, or Firm—Dwight A. Marshall

[57] ABSTRACT

A method for controlling a process of realizing a product. The method defines activities of the process, their precedence relationships and the flow of information among the interconnected activities required to create the product. Resources are allocated and the defined activities are scheduled to complete the process. The method monitors the allocated resources and outputs of the interconnected activities and controls the process by dynamically reconfiguring the activities in accordance with time-variant criterion and selectively modifying the activities in accordance with monitored outputs of the activities to maintain optimal design, fabrication and assembly of the product.

12 Claims, 3 Drawing Sheets

PRODUCT REALIZATION METHOD

TECHNICAL FIELD

The invention relates to a method for managing a process of designing fabricating and assembling a product.

BACKGROUND AND PROBLEM

The creation of a product requires activities interconnected to form a process for the product manufacture. In the overall product realization process a research and development organization executes the product design activities and turns the completed product design over to a manufacturing organization. The manufacturing organization develops fabrication and assembly activities that enable final assembly of the product. Normally, the design, fabrication and assembly activities are executed at different intervals of time by organizations relatively independent of the other in that some activities are required to be completed before work can be started on other activities. Problems arise in that errors inadvertently occur in activities that may affect subsequent activities that are influenced by failures occurring in preceding activities. Other problems arise in that criteria used in design, fabrication and assembly activities may vary in time and in a manner determined by a user of the process. These problems often require modification of various activities resulting in the stopping of the manufacturing process to prevent the manufacture of defective product.

SOLUTION

The foregoing problems are solved and product realization processes are substantially enhanced by a method arranged for managing a process of creating a product wherein the product realization process is dynamically reconfigured in accordance with user entered and time-variant criteria by selectively modifying the process in accordance with monitored outputs of the process activities to maintain optimal design and manufacture of the product. The method defines activities of the product realization process and the flow of information among the interconnected activities required to create the product. Resources are allocated to the defined activities and the defined activities are scheduled to complete the product realization process. The method monitors the allocated resources and outputs of the interconnected activities and controls the process by dynamically reconfiguring the activities in accordance with both user entered and time-variant criteria and selectively modifies the activities in accordance with the monitored activity outputs to maintain optimal design and manufacture of the product.

DRAWING DESCRIPTION

DETAILED DESCRIPTION

Figure 1:
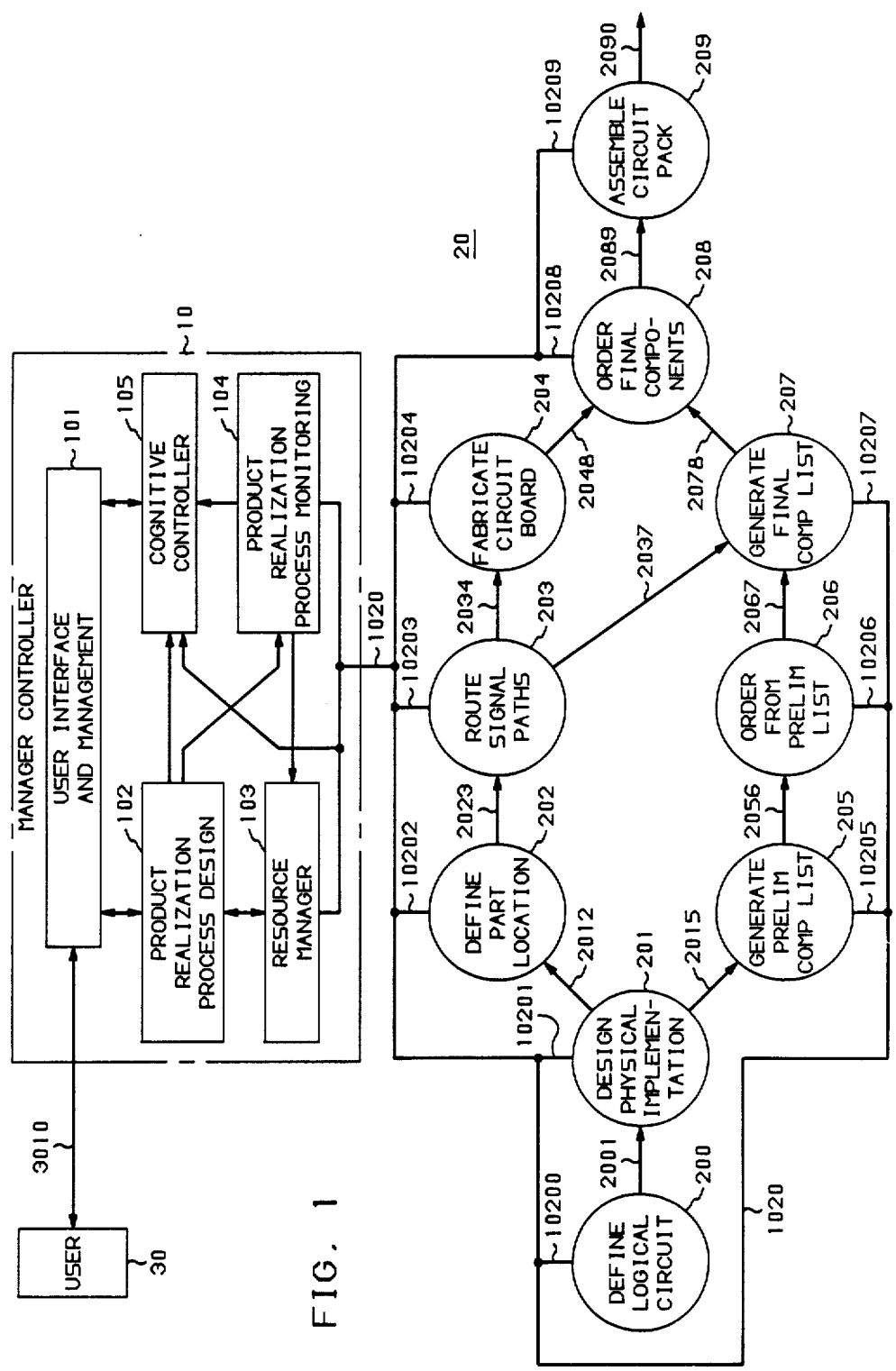
FIG. 1 is a block diagram of design and manufacturing activities interconnected to form a product realization process embodying the principles of the invention.

Product realization process 1 of the present embodiment of the invention, FIG. 1, has activities interconnected to form an illustrative process for manufacturing an electronic circuit pack. The present invention is not limited for use with the manufacture of electronic circuit packs but may also be advantageously utilized with other types of product realization processes as well. Activity 200 defines the logical design of electronic circuitry that is to be assembled on a circuit board and identifies the electrical components and the interconnection of the components necessary for the operation of the assembled circuit pack. A computer aided design (CAD) system interconnected with manager controller 10 may be used by a circuit designer to design the electronic circuitry defined by activity 200. The logical circuit design information generated by activity 200 is transferred to design physical implementation activity 201 as is represented by interconnection path 2001.

Design physical implementation activity 201 specifies the identity of the various components of the electronic circuitry developed by activity 200. For example, activity 200 may specify that the circuit design requires a microprocessor chip. Activity 201 then identifies the types of microprocessor chips that will meet the requirements of the designed electronic circuitry. Information developed by design physical implementation activity 201 is transferred to both define part location activity 202 and generate component list activity 205 as represented by interconnection paths 2012 and 2015, respectively.

Activity 205 generates a preliminary list of components in accordance with information received from physical implementation activity 201 and transfers the component preliminary list information via path 2056 to order from preliminary list activity 206. Order from preliminary activity 206 prepares preliminary orders from the received component list and transfers the preliminary ordering information to generate final component list activity 207 as represented by path 2067.

In parallel with activities 205 and 206, define part location activity 202 utilizes the information received from proceeding activities 200, 201 and locates each of the circuit components on an outline of the circuit board in accordance with the dimensions of the board. The information is then transferred to route signal paths activity 203 as indicated by path 2023. Activity 203, having received information identifying the board location of each of the circuit components, establishes and routes circuit board signal conducting paths between each of located circuit board components. Component board location generated by activity 202 and signal path information generated by activity 203 are given both to fabricate circuit board activity 204 and generate final component list activity 207 as shown by interconnection paths 2034 and 2037, respectively.

Activity 204 on receiving the identity and location of the circuit components and the routing of the signal conducting paths therebetween, fabricates the circuit board by drilling the necessary holes to receive the circuit components and plating the signal conducting paths on the circuit board. The completed circuit boards are then routed to the assembly area as indicated by interconnection path 2048.

After receiving information from fabricate circuit board activity 204, the component list order information received from generate final component list activity 207 is reviewed for changes by order final components activity 208 and orders are prepared to order the circuit components from component vendors. Assembly information is transmitted to assembly circuit pack activity 209 wherein the ordered circuit components are assembled onto the fabricated circuit board. The assembled circuit packs are subsequently tested and upon passing all tests are shipped to customers.

As earlier set forth, activities 201 through 203 and 205 through 207 may well be part of a CAD system. Fabricate circuit board activity 204 is a circuit board line wherein circuit boards are fabricated in accordance with information received from activities 200 through 203. Order final components activity 208 may well be a purchasing department computer system interconnected with the circuit board fabrication department and CAD computer systems. The assemble circuit pack activity 209 is an assembly line department wherein the circuit pack is assembled in accordance with information generated by preceding activities 200 through 208 information.

Figure 3:
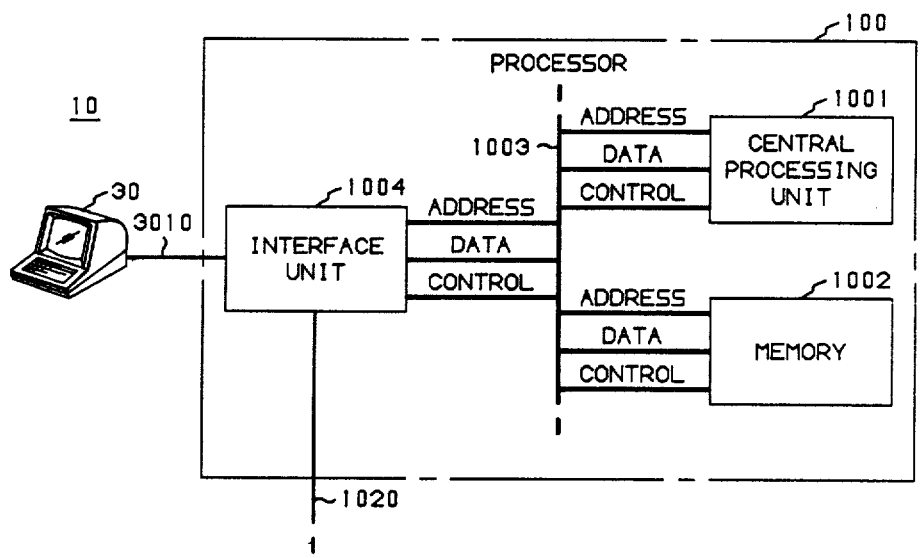
FIG. 3 is a block diagram of a processor for controlling the process of FIG. 1.

Manager controller 10 is a processor 100 as set forth in FIG. 3 and includes a stored program central processing unit 1001 interconnected by a bus 1003 through address, control and data leads with a memory unit 1002. In addition, central processing unit 1001 and memory unit 1002 are interconnected by bus 1003 with interface unit 1004 arranged to interface processor 100 with data bus 1020. It is intended that processor 100 and the component parts thereof be conventional and well-known, such as an AT&T 3B20 computer. The present invention is not limited for use with an AT&T 3B20 computer but may be utilized with other types of computers as well.

Figure 2:
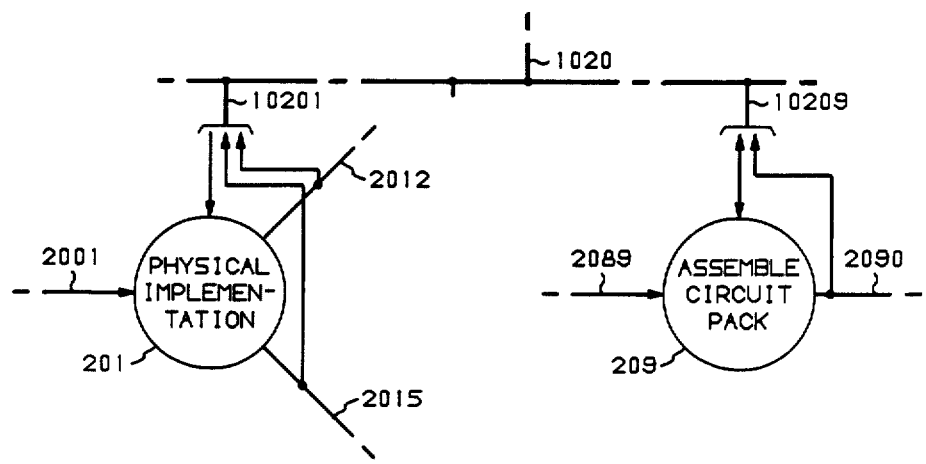
FIG. 2 illustrates the interconnection relationship of typical activities set forth in FIG. 1 with a manager controller 10.

Processor 100, functioning as manager controller 10, FIG. 1, is connected by data bus 1020 with activities 200 through 209 such that information may be sent to and received from each. For example, physical implementation activity 201, FIG. 2, sends information to activities 202 and 205 as indicated by interconnection paths 2012 and 2015, respectively. Thus, each of the path outputs from physical implementation activity 201 is connected via data buses 10201, 1020, FIG. 1, with manager controller 10 such that manager controller 10 may transmit information to activity 201 and determine if the information received from activity 201 is error free. Activity 201 is also connected to data buses 10201, 1020 so that information concerning the operation of activity 201 may be exchanged with manager controller 10. Similarly, each of the other activities such as activity 209 is connected via buses 10209, 1020 with manager controller 10.

Manager controller 10, FIG. 1, functions to realize the product by using several strategies and provides a mechanism for managing changes that are required during design, fabrication and assembly of the product. In addition, manager controller 10 coordinates the activities and initiates different activity functions to insure optimal design and manufacture of the product. User interface and management module 101 runs manager controller 10. It operates modules 102 through 105 and provides an entry point from which a user terminal 30 can access the manager controller modules. Product realization process design module 102 defines the activities, their precedence relationship and the flow of information among the interconnected activities. In particular, module 102 generates precedence directed data flows defining the functions of each activity, the sequence of activities and simulates the operation on each generated data flow. An editor is provided to enable a user to define and modify both new and existing functions, activities and the precedence relationship of activities.

Resource manager module 103 functions to allocate resources to each activity. In order to perform its function, resource manager 103 requires information as to all of the resources that are a part of the manufacturing process and the current status of each activity. The information received from each of the activities identifies the status of the activity functions and the time that the function is due to be completed. In addition, product realization process design module 102 provides directed data flow information on the functions of each activity and the time estimated to complete each activity function. Resource manager module 103 utilizes this information to schedule activity functions to meet deadlines by determining and triggering each activity function to be performed. Module 103 also determines the utilization of the allocated resources and allocates the resources in an optimal fashion.

Product realization process monitoring module 104 has two subsystems for monitoring the resources and the product process activities. Each activity provides information identifying the initiation and completion of a function and identifies resources that are not available. The activity information is processed and based upon the content, distributed to resource manager module 103. Product realization process monitoring module 104 also receives function data flow information from product realization process design module 102 and by relating the monitored information received from each activity function thereto, is able to determine the status of each activity function.

Cognitive controller module 105 controls the flow of information within manager controller 10 and the product realization process. In particular, cognitive controller 105 has two operational modes for handling the management of predetermined information flow and system errors. Control messages are received over data bus 1020 from each activity 200 through 209 and analyzed to decide what action should be taken. A user located at terminal 30 and connected to manager controller 10 by data bus 3010 can either accept the decision of manager controller 10 or modify the decision depending upon information entered by terminal 30 into manager controller 10.

Cognitive controller module 105 directs information flow among the product realization process activities based on the data flow of each activity function developed by product realization process design module 102 and upon the information flow between the interconnected activities. Information is received from the output of each activity and is directed to appropriate activities in accordance with the generated data flow information. The two operational modes of cognitive controller module 105 are predetermined information flow management and error handling. In the predetermined information flow management mode, module 105 directs information flow among the activities based on each activity data flow diagram. Information is received from each activity of the product realization process. Based on the appropriate directed data flow diagrams, information is directed to appropriate activities that require action.

Figure 4:
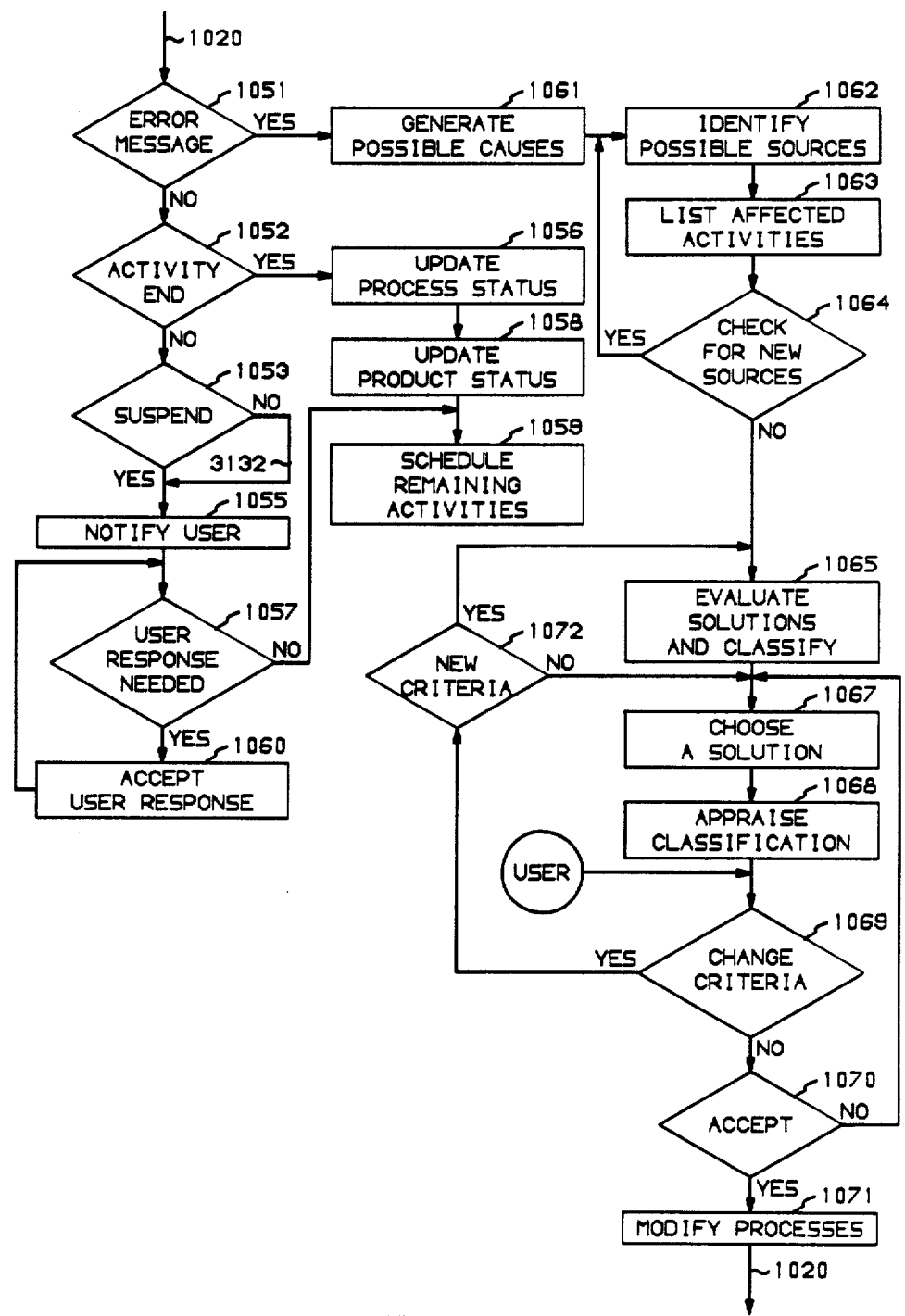
FIG. 4 illustrates a flow chart of the method for managing the activities of the process of FIG. 1.

When information is received from an activity, FIG. 4, cognitive controller module 105 determines, step 1051, if the received information is or is not an error message. If the received message is not an error message, cognitive controller module 105 determines at step 1052 if the activity is at an end. When the end of the activity has occurred, steps 1056, 1058, the status of the activity and the product are updated and cognitive controller module 105, step 1059, schedules the remaining activities.

Step 1053 determines if the activity should be suspended if the end of the activity does not occur in step 1052. Should the activity be suspended, the user is notified at step 1055. An activity which is not at an end and which is not to be suspended notifies the user at step 1055. If a user response is required, step 1057, cognitive controller module 105 accepts the response, step 1060, and enables step 1059 to schedule remaining activities.

When an error message is detected indicating that an output of an activity has experienced a failure, cognitive controller module 105 generates, step 1061, possible causes that may have occurred in the failed activity or in preceding activities to cause the error. For example, an error occurring at the output of activity 202, FIG. 1, may be caused by the fact that the components are located too close together on the circuit board. A failure at the output of activity 209 may be caused by components that are missing from the circuit board. The output of activity 208 may indicate an error caused by the fact that a specified component cannot be obtained or purchased from a vendor. Thus, cognitive controller module 105 detects error messages generated by activity failures and responds thereto by generating causes of the failures and recommending specific actions.

Step 1062 identifies activities that may be sources of each failure. If a failure of activity 202, FIG. 1, is caused by components being located too close together, then the source of the error cause may be in activities 200, 201 or 202. The define logical circuit activity 200 may be such the electronic circuit design requires short transmission paths between the components. Design physical implementation activity 201 may be a cause of failure in that oversized components were selected thereby interfering with adjacent components. Activity 202, defining component location, may also be a source of the failure in that the selection of where the component is to be located on the circuit board may be too close to an adjacent component.

If a missing component on an assembled circuit pack is a cause of an error message received from assemble circuit pack activity 209, then activities 200, 201 and 205 through 209 may be a source of the failure of activity 209. For example, the missing component may have inadvertently been omitted from the output of activity 200 which was the input to design physical implementation activity 201. The missing component may also be caused by an error occurring in physical implementation activity 201 or in any of the activities 205 through 209.

The output of order final components activity 208 may indicate that an error has occurred in one of the preceding activities 200 through 208 in that the required component cannot be purchased. The circuit board may not be completed by fabricate circuit board activity 204 and the design logical circuit activity 200 may specify a type of component that is no longer available. Furthermore, an error may occur in ones of the activities 205 through 207 relating to the list of components. The output of assemble circuit pack activity 209 may generate an error message to the effect that the activity cannot place a component on the circuit board. The cause of this error message may be a fault that occurs in one of the activities 200 through 204 relating to the design and fabrication of the circuit board. The cause of the failure may be a fault that occurs in activities 205 through 208 relating to the order and purchase of components. It may also be that activity 209 cannot place the component on the circuit board in that an assembly machine cannot handle a particular type of component or cannot insert the component leads into holes of the circuit board.

Once the possible sources of the activity failure have been identified, step 1063, FIG. 4, lists, using the precedence directed data flows generated by manager controller module 102, all dependent activities that may be the sources of the one activity failure. Step 1064 then checks for new sources that may be the cause of the error message. If a new source has occurred, for example, new criteria may have been entered into the manufacturing process by a user of terminal 30, the cognitive controller module 105 repeats steps 1062 through 1064 by checking for other ones of the activities that may be sources of the one activity failure.

Step 1065 evaluates solutions for correcting the activities identified as possible sources of the one activity failure and assigns classifications thereto. In evaluating each solution, step 1065 applies criteria such as the date that the product must be shipped. Other criteria that may be considered is the cost of the solution, the number of activities involved in the solution, will the solution delay the activity in providing information to interconnected activities, the amount of data required for the solution and the cost of the components and circuit board modifications required by the solution. Various other criteria may be provided for the manufacturing process of the embodiment of the present invention and for different manufacturing processes. User terminal 30 may also be used to enter new and update existing criteria into manager controller 10.

Manager controller 10 chooses one of the evaluated solutions, step 1067, and appraises the classification of the chosen solution. Step 1068 evaluates each solution chosen by step 1067, calculates all the criteria relating to the chosen solution and assigns a value thereto. When the calculated value exceeds a predefined standard the solution is classified as not feasible and is rejected. Step 1069 determines if there has been a change in the criteria data base assigned to each solution. If there has been a change in the criteria assigned the chosen solution, which may vary over time as entered by user terminal 30, step 1072 determines if the changed criteria is new or old. When step 1072 determines that the changed criteria is old, cognitive controller module 105 repeats steps 1067 through 1069 by choosing a solution in accordance with the changed criteria. Should the criteria be new, the solutions are then evaluated in accordance with the new criteria and again classified by steps 1065 through 1069.

After step 1069 determines that there has not been a change in the criteria, step 1070 asks if the solution is to be accepted. If the solution is not accepted by step 1070, the method repeats steps 1067 through 1070 to select another solution. When the chosen solution is accepted, the product realization process is reconfigured by changing and modifying the manufacturing process activities, step 1071, in accordance with the accepted solution by manager controller 10 sending data over data bus 1020 to the appropriate activities.

Manager controller 10 derives solutions in response to operation of the activities for enabling reconfiguration of the product realization process and assigns classification codes to each derived solution identifying resulting design and manufacture changes of the product. The derived solutions are selected in conformance with the assigned classification codes and the appropriate activities modified in accordance with the selected solution to maintain optimal design and manufacture of the product.

What is claimed is:

1. A method for managing a process of realizing a product comprising the steps of
   defining activities and information flow among interconnected ones of the activities, and
   controlling the process by monitoring each of the defined activities and deriving solutions in response to operation of the activities for dynamically reconfiguring the activities in accordance with user entered and time-variant criteria by selectively modifying the monitored activities to maintain continuous optimal design and manufacture of the product.

2. A method for managing a process of realizing a product comprising the steps of
   defining the activities and information flow among interconnected ones of the activities,
   allocating resources to and scheduling the defined activities,
   monitoring the allocated resources and outputs of each of the interconnected activities, and
   controlling the process by deriving solutions in response to operation of the monitored activities and dynamically reconfiguring the activities in accordance with the derived solutions and with both user entered and time-variant criteria by selectively modifying the activities in accordance with the monitored activity outputs to maintain continuous optimal design and manufacture of the product.

3. The product realization method set forth in claim 2 wherein said defining step comprises the steps of
   generating data flows defining functions comprising each activity, and
   simulating operation of the generated data flows.

4. The product realization method set forth in claim 3 wherein said resource allocating and activity scheduling step comprises the steps of
   determining status of each activity, and
   estimating time required to perform each activity.

5. The product realization method set forth in claim 4 wherein said resource and output monitoring step comprises the step of
   receiving status of each activity and of the allocation of the resources.

6. The product realization method set forth in claim 5 wherein said controlling and modifying step comprises the steps of
   deriving solutions in response to operation of the activities for enabling reconfiguration of the process and assigning classification codes to each derived solution identifying resulting design and manufacture changes of the product,
   selecting ones of the derived solutions in accordance with the assigned classification codes, and
   modifying ones of the activities in accordance with the selected solution to maintain optimal design and manufacture of the product.

7. The product realization method set forth in claim 6 wherein said solution deriving step comprises the steps of
   detecting messages generated by each activity,
   generating causes of an activity failure upon detecting one of said messages identifying a failure occurring in an activity,
   identifying ones of the activities that may be sources of the one activity failure,
   listing ones of the activities that may be affected by said identified source activities, and
   checking for other ones of the activities that may be sources of said one activity failure.

8. The product realization method set forth in claim 7 wherein said solution selecting step comprises the steps of
   evaluating solutions for correcting said activities identified as possible sources of said one activity failure,
   classifying each of said evaluated solutions,
   choosing one of said evaluated solutions, and
   appraising classification of said chosen solution.

9. The product realization method set forth in claim 8 wherein said activity modifying step comprises the steps of
   accepting said chosen solution, and
   reconfiguring said activities in accordance with said accepted solution.

10. The product realization method set forth in claim 8 comprising the step of
    enabling a user terminal access to said product managing method.

11. The product realization method set forth in claim 10 wherein said solution selecting step comprises the step of
    changing criteria defining said classification codes at various user defined times.

12. A method for managing a process of realizing a product comprising the steps of:
    generating directed data flows defining activities interconnected in a precedence relationship to form the product realization process,
    simulating operation of the generated activity directed data flows,
    allocating resources to and scheduling the defined activities of each activity,
    determining status of each activity,
    estimating time required to perform each activity,
    receiving status of an initiation and completion of activities and of the allocation of the resources,
    deriving solutions in response to operation of the activities for enabling reconfiguration of the product realization process and assigning classification codes to each derived solution identifying resulting design and manufacture changes of the product,
    selecting ones of the derived solutions in accordance with the assigned classification codes, and
    modifying ones of the activities in accordance with the selected solutions to maintain optimal design and manufacture of the product.

* * * * *

REEXAMINATION CERTIFICATE (2511th)

United States Patent [19]
Ben-Arieh et al.

[11] B1 4,807,108
[45] Certificate Issued  Mar. 28, 1995

[54] PRODUCT REALIZATION METHOD

[75] Inventors: David Ben-Arieh, Columbus; Charles A. Fritsch, New Albany; Kostia Mandel, Columbus, all of Ohio; Albert F. Starzinski, Long Branch, N.J.; Raghunath Venugopal, Columbus, Ohio

[73] Assignee: Bell Telephone Laboratories Inc., American Telephone & Telegraph Co., Murray Hill, N.J.

Reexamination Request:
No. 90/002,060, Jun. 22, 1990

Reexamination Certificate for:
Patent No.: 4,807,108
Issued: Feb. 21, 1989
Appl. No.: 83,329
Filed: Aug. 10, 1987

[51] Int. Cl.$^6$ .................. G05B 13/02; G06F 15/46
[52] U.S. Cl. ................... 364/148; 364/468; 364/474.15; 364/474.16; 364/474.24; 395/500
[58] Field of Search ... 364/200 MS File, 900 MS File, 364/148, 402, 468, 470, 474.15, 474.16, 474.24, 570, 571.08

[56] References Cited
U.S. PATENT DOCUMENTS
3,922,642  11/1975  Tooka .................. 340/172.5

OTHER PUBLICATIONS

Baker et al "Fabrication and Assembly Operations", IBM System Journal, vol. 4, 1965, pp. 86–257.
Murray et al "Integration of CAD/CAM with flexible manufacturing and assembly", Denmark, 20-23 May, 1986.
Gindy et al "Flexible manufacturing for mixed metal forming and machining operations", Proceedings of the 3rd International Conference on Flexible Manufacturing System, 11-13 Sep. 1984.
Puente et al "DISAM/2 An experience in flexible manufacturing systems", Proceedings of the 3rd International Conference on Flexible Manufacturing System, 11-13, Sep. 1984.

*Primary Examiner*—Thomas C. Lee

[57] ABSTRACT

A method for controlling a process of realizing a product. The method defines activities of the process, their precedence relationships and the flow of information among the interconnected activities required to create the product. Resources are allocated and the defined activities are scheduled to complete the process. The method monitors the allocated resources and outputs of the interconnected activities and controls the process by dynamically reconfiguring the activities in accordance with time-variant criterion and selectively modifying the activities in accordance with monitored outputs of the activities to maintain optimal design, fabrication and assembly of the product.

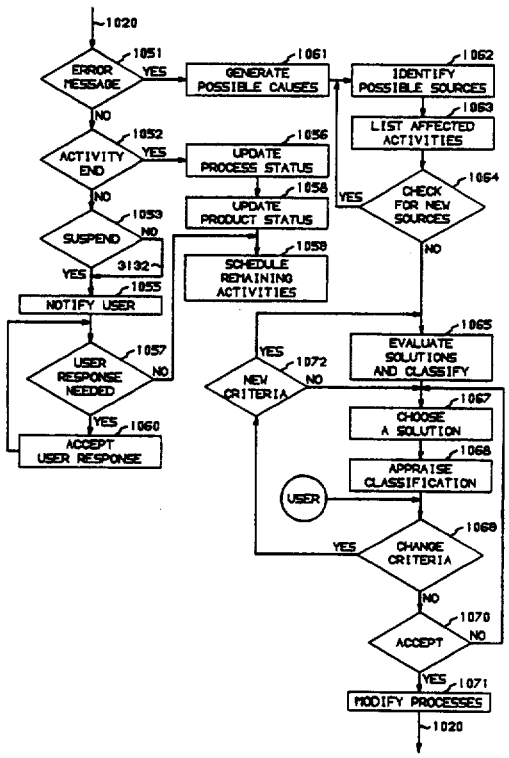

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-12 are cancelled.

* * * * *